United States Patent
Kim

(10) Patent No.: US 8,272,103 B2
(45) Date of Patent: Sep. 25, 2012

(54) STEP HINGE FOR PORTABLE COMMUNICATION TERMINALS

(76) Inventor: Chang Soo Kim, Bucheon-si (KR)

( * ) Notice: Subject to any disclaimer, the term of this patent is extended or adjusted under 35 U.S.C. 154(b) by 309 days.

(21) Appl. No.: 12/664,045

(22) PCT Filed: Jun. 11, 2008

(86) PCT No.: PCT/KR2008/003261
§ 371 (c)(1),
(2), (4) Date: May 17, 2010

(87) PCT Pub. No.: WO2008/153317
PCT Pub. Date: Dec. 18, 2008

(65) Prior Publication Data
US 2010/0291978 A1  Nov. 18, 2010

(30) Foreign Application Priority Data
Jun. 12, 2007  (KR) .................. 10-2007-0056986

(51) Int. Cl.
*E05D 11/10* (2006.01)
(52) U.S. Cl. ............... 16/334; 16/303; 16/374; 248/922
(58) Field of Classification Search .............. 16/334, 16/330, 303, 297, 342, 386, 374; 379/433.13; 361/679.27; 248/921–923; 455/575.3
See application file for complete search history.

(56) References Cited

U.S. PATENT DOCUMENTS

| | | | | | |
|---|---|---|---|---|---|
| 5,475,752 | A | * | 12/1995 | Mischenko | 379/433.11 |
| 5,537,472 | A | * | 7/1996 | Estevez-Alcolado et al. | 379/433.02 |
| 5,828,966 | A | * | 10/1998 | Davis et al. | 455/573 |
| 6,085,387 | A | * | 7/2000 | Han | 16/330 |
| 6,125,507 | A | * | 10/2000 | Katoh | 16/329 |
| 6,284,407 | B1 | * | 9/2001 | Murray et al. | 429/186 |
| 6,292,980 | B1 | * | 9/2001 | Yi et al. | 16/303 |
| 6,745,436 | B2 | * | 6/2004 | Kim | 16/330 |
| 7,096,536 | B2 | * | 8/2006 | Johnson | 16/300 |
| 7,100,244 | B2 | * | 9/2006 | Qin et al. | 16/330 |
| 7,140,074 | B2 | * | 11/2006 | Han et al. | 16/366 |
| 7,150,072 | B2 | * | 12/2006 | Huang et al. | 16/312 |
| 7,171,247 | B2 | * | 1/2007 | Han | 455/575.3 |
| 7,173,825 | B2 | * | 2/2007 | Han et al. | 361/725 |
| 7,203,995 | B2 | * | 4/2007 | Hsu et al. | 16/330 |
| 7,536,751 | B2 | * | 5/2009 | Kim | 16/334 |
| 2006/0085947 | A1 | * | 4/2006 | Ge et al. | 16/303 |
| 2006/0230579 | A1 | * | 10/2006 | Ko et al. | 16/330 |
| 2006/0242795 | A1 | * | 11/2006 | Duan et al. | 16/330 |
| 2007/0039133 | A1 | * | 2/2007 | Kim | 16/325 |
| 2007/0151078 | A1 | * | 7/2007 | Kim et al. | 16/325 |

FOREIGN PATENT DOCUMENTS

| | | |
|---|---|---|
| KR | 20-0173283 | 3/2000 |
| KR | 10-2005-0091631 | 9/2005 |
| KR | 10-2006-0010166 | 2/2006 |
| KR | 10-2006-0122998 | 12/2006 |
| KR | 10-2007-0056986 | 6/2007 |
| KR | 10-0724431 | 6/2007 |
| KR | 10-2008-0092893 | 9/2008 |
| WO | WO2006/129911 | 12/2006 |

* cited by examiner

*Primary Examiner* — William L. Miller
(74) *Attorney, Agent, or Firm* — Harness, Dickey & Pierce, P.L.C.

(57) ABSTRACT

The present invention relates to a step hinge for a portable communication terminal, and more particularly to a step hinge mounted to a portable communication terminal, which can rotate at various angles thereto. A step hinge for a portable communication terminal according to the present invention, comprises: a housing; a rotating member mounted in the housing; a friction member mounted in the housing and contacting the rotating member; a belleville spring disposed in the housing so as to press the friction member and the rotating member for a tight contact therebetween.

16 Claims, 5 Drawing Sheets

STEP HINGE FOR PORTABLE COMMUNICATION TERMINALS

Cross Reference to Related Applications

This application is a 371 of PCT International Application No. PCT/KR2008/003261 filed Jun. 11, 2008, published as WO 2008/153317 on Dec. 18, 2008, which claims priority to Korean Patent Application No. KR 10-2007-0056986 filed Jun. 12, 2007, (now abandoned). The entire disclosure of the above application is incorporated herein by reference.

TECHNICAL FIELD

The present invention relates to a step hinge for a portable communication terminal, and more particularly to a step hinge mounted to a portable communication terminal, which can rotate a support device at various inclination angles.

BACKGROUND ART

The portable communication terminal can be defined as a terminal having a communication module, such as a CDMA (Code Division Multiplexing Access) module, a Bluetooth module, a wired or wireless LAN card, etc. and a microprocessor with an arithmetic capacity for a multimedia function. That is, the portable communication terminal is an electronic device, the examples of which are a PDA (Personal Digital Assistant), a smart phone, a hand held personal computer, a mobile phone, a MP3 player and the like.

A recently introduced portable communication terminal has many functions such as satellite DMB (Digital Multimedia Broadcasting), ground wave DMB and PMP (Portable Multimedia Player). As such, users can see movies or TV programs with the portable communication terminal. Thus, the users often utilize the portable communication terminal over a long period of time.

In such a case, there is a problem in that the user can feel fatigue, muscle pain and discomfort with long time hand-held use of the portable communication terminal.

Further, there is another problem in that the broadcasting functions cause an antenna of the portable communication terminal to be longer and the size of the terminal to be larger.

Hereinafter, the prior art portable communication terminal will be described with reference to FIGS. 1 to 3.

FIG. 1 shows a portable communication terminal and a battery charger according to the prior art.

As shown in FIG. 1, a portable communication terminal (1) is charged and supported on a charger (10). A bottom surface (11) of the charger (10) is flat so as to be laid on the ground. Further, a supporting groove (13) is formed at a front face (12) of the charger (10) where the portable communication terminal (1) is inserted.

The portable communication terminal (1) is supported on the supporting groove (13), which is inclined to the ground by a certain angle. Thus, the portable communication terminal (1) supported on the supporting groove is inclined to the ground. The slope of the portable communication terminal (1) causes the user to feel more comfortable when he/she watches movies or television programs over a long period of time with the portable communication terminal.

However, there is a problem in that the user must always carry the support such as the charger. Further, the user cannot adjust the angle of the portable communication terminal slope since the angle of inclination of the support is fixed.

FIG. 2 is a perspective view of a support device for a portable communication terminal according to the prior art. FIG. 3 is an enlarged perspective view of portion III shown in FIG. 2.

As shown in FIG. 2, a support device (30) is coupled to both sides (22, 23) of the portable communication terminal (20). A display (21) is formed at the front face of the portable communication terminal (20). The support device (30) has the 'U' shape. A hinge (31) is formed at both ends of the support device (30). The hinge (31) of the support device (30) is rotatably coupled at both sides (22, 23) of the portable communication terminal (20).

As shown in FIG. 3, coupling portions (24) are formed at both sides (22, 23) of the portable communication terminal (20). The coupling portion (24) has a step portion (25) and a flat portion (26).

The support device (30), which is shaped as 'U', is rotatably coupled to the coupling portion (24). The support device (30) can rotate from the flat portion (26) to the step portion (25). The portable communication terminal (20) is stably supported in a state such that the hinge (31) is in contact with the step portion (25) and the portable communication terminal (20) is inclined in a certain angle to the ground.

However, there is a problem in that the user cannot adjust the direction to which the portable communication terminal directs with the support device. Also, there is a problem in that the user must always carry the support device for supporting the portable communication terminal.

DISCLOSURE OF INVENTION

Technical Problem

The present invention is conceived in order to solve the above problems. It is an objective of the present invention to provide a step hinge mounted to a portable communication terminal for supporting the portable communication terminal, with which the user can variously adjust the direction of the supported portable communication terminal.

Technical Solution

In order to achieve the objective, the present invention provides a step hinge for a portable communication terminal comprising: a housing; a rotating member mounted in the housing; a friction member mounted in the housing and contacting the rotating member; a belleville spring disposed in the housing so as to press the friction member toward the rotating member for tight contact between the friction member and the rotating member.

The rotating member has a first stopper facing the friction member. The friction member has a second stopper facing the rotating member. When the side surface of the first stopper and the side surface of the second stopper are in contact with each other, the rotating member cannot rotate any more. Thus, the first and second stoppers limit the rotating range of the rotating member.

The rotating member includes first cam protrusions protruded toward the friction member. The friction member includes second cam protrusions protruded toward the rotating member. The friction member mounted in the housing can vibrate to the rotating member or away from it, while the rotating member rotates. This is due to the position change of the first and second cam protrusions.

Advantageous Effects

A step hinge for a portable communication terminal according to the present invention can be mounted to the portable communication terminal and can support the portable communication terminal with various inclination angles.

Also, in accordance with the present invention, the total thickness of the step hinge can be reduced using the belleville spring.

Further, in accordance with the present invention, the user can determine how much the step hinge has been rotated and feel the vibrations made by the first and second cam protrusions.

MODE FOR THE INVENTION

A preferred embodiment of the present invention will now be described with reference to the accompanying drawings.

Figure 1:
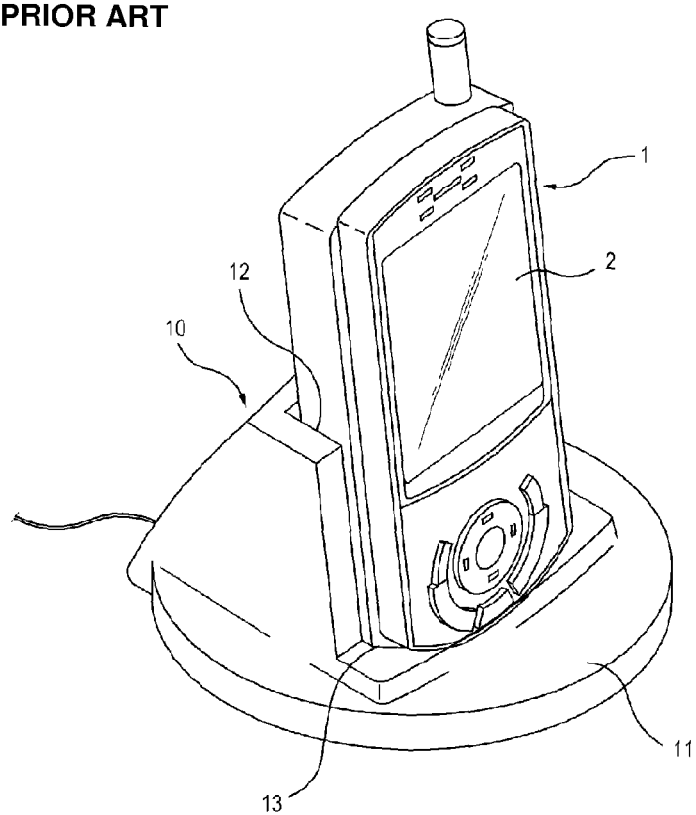
FIG. 1 is a perspective view of a prior art portable communication terminal.
Figure 2:
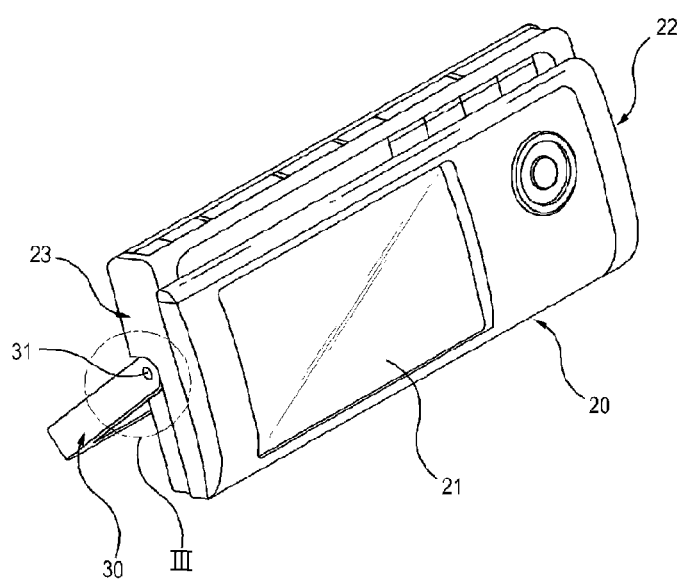
FIG. 2 is a perspective view of a prior art portable communication terminal having a support device.
Figure 3:
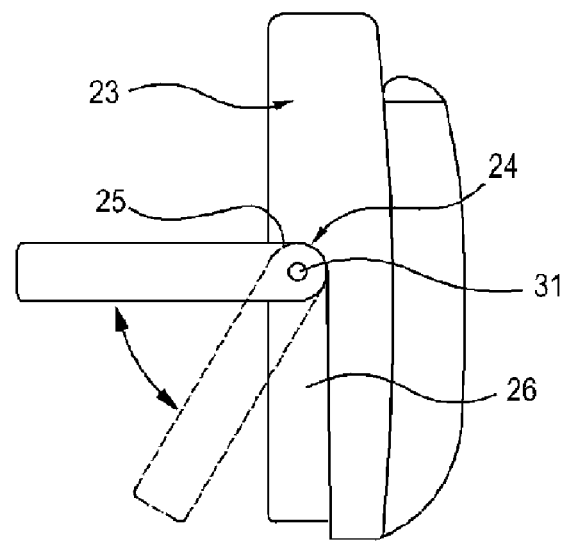
FIG. 3 is an enlarged perspective view of portion III shown in FIG. 2.
Figure 4:
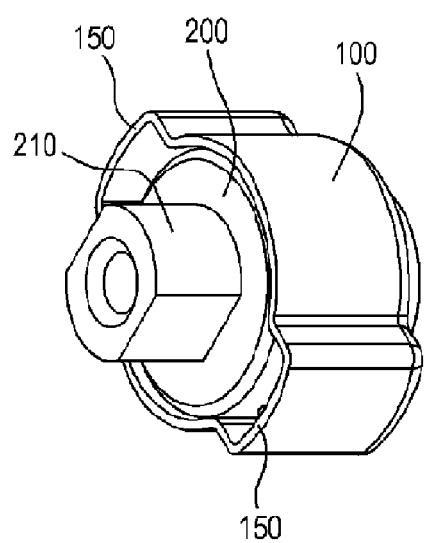
FIG. 4 is a perspective view of a step hinge according to the present invention.
Figure 5:
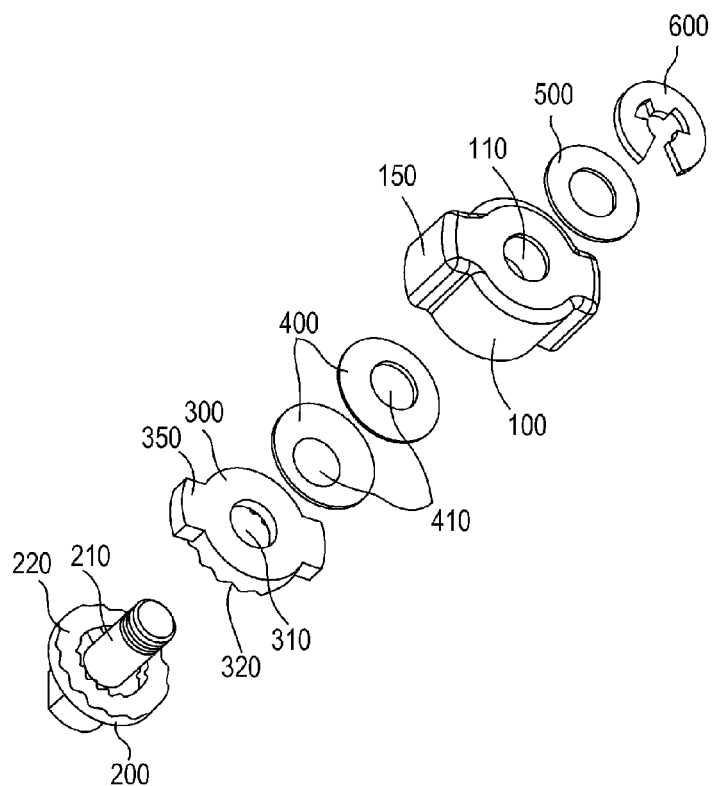
FIG. 5 is an exploded view of the step hinge shown in FIG. 4.
Figure 6:
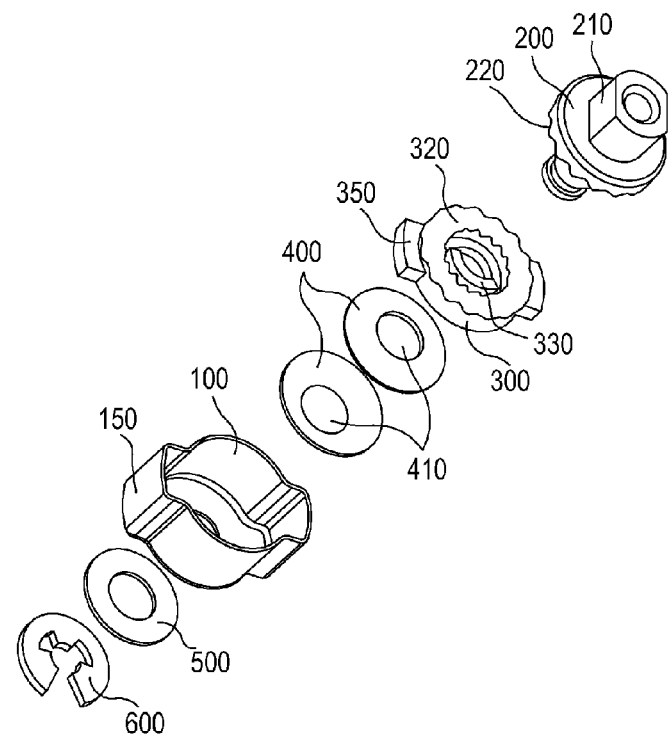
FIG. 6 is an exploded view of the step hinge shown in FIG. 5 seen from a different location.
Figure 7:
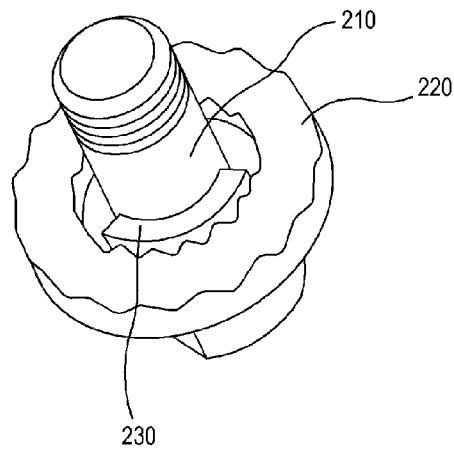
FIG. 7 is a perspective view of a rotating member of the step hinge shown in FIG. 4.
Figure 8:
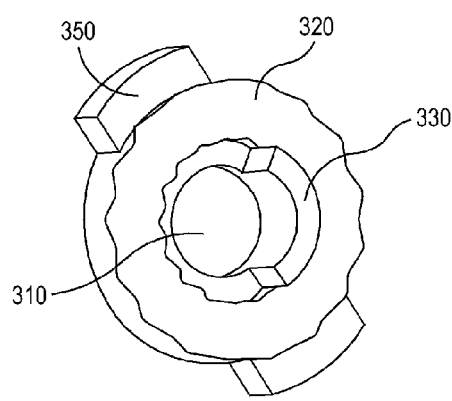
FIG. 8 is a perspective view of a friction member of the step hinge shown in FIG. 4.

FIG. 4 is a perspective view of a step hinge according to the present invention. FIG. 5 is an exploded view of the step hinge shown in FIG. 4. FIG. 6 is an exploded view of the step hinge shown in FIG. 5 seen from a different location. FIG. 7 is a perspective view of a rotating member of the step hinge shown in FIG. 4. FIG. 8 is a perspective view of a friction member of the step hinge shown in FIG. 4.

As shown in FIGS. 4 to 8, a step hinge comprises a housing (100), a rotating member (200), a friction member (300), belleville springs (400), a washer (500) and a fixing ring (600).

An end of the housing (100) is opened and a first via hole (110) is formed on the opposite end. There is a space in the housing (100) to accommodate the rotating member (200), the friction member (300) and the belleville springs (400).

The rotating member (200) rotates at the opened end of the housing (100). The rotating shaft (210) is formed at the center of the rotating member (200). The rotating shaft (210) is inserted into the first via hole (110) of the housing (100).

The friction member (300) is mounted within the housing. An end of the friction member (300) contacts the rotating member (200). A second via hole (310) is formed at the center of the friction member (300). The rotating shaft (210) passes through the second via hole (310).

The opposite faces of the rotating member (200) and the friction member (300) can be flat for a plain contact. However, in this embodiment, a plurality of the first cam protrusions (220) are formed on the rotating member (200) and a plurality of the second cam protrusions (320) are formed on the friction member (300), while the first cam protrusions (220) contact the second cam protrusions (320). That is, the first cam protrusions (220) are radialy protruded on the surface of rotating member (200) directed toward the friction member (300), while the second cam protrusions (320) are radialy protruded on the surface of the friction member (300) directed toward the rotating member (200).

When a user rotates the rotating member (200), he/she can feel vibrations generated while the first protrusions (220) pass over the second protrusions (320). Thus, the user can determine how much the rotating member (200) has been rotated.

As shown in FIGS. 7 and 8, the rotating member (200) includes a first stopper (230) facing the friction member (300) and the friction member (300) includes a second stopper (330) facing the rotating member (200).

Thus, the rotating member (200) cannot rotate any more when the side surfaces of the first stopper (230) and the second stopper (330) contact each other. This is to limit the rotating range of the rotating member (200).

A pair of guides (350) are extended from both sides of the friction member (300).

The housing (100) includes a pair of guide receiving portions (150) for receiving the guides (350). The guides (350) can slide back and forth in the guide receiving portions (150).

The guides (350) of the friction member (300) in the guide receiving portions (150) prevent the friction member (300) from rotating despite the rotation of the rotating member (200). The friction member (300) slides back and forth in the housing (100) without rotation while the rotating member (200) rotates.

Two belleville springs (400) are disposed between the housing (100) and the friction member (300). The belleville springs (400) press the friction member (300) so as to be in tight contact with the rotating member (200).

Third via holes (410) are formed at the belleville springs (400). The rotating shaft (210) of the rotating member (200) passes through the third via holes (410).

Two belleville springs (400) are in contact with each other while their large-diameter portions contact each other. The belleville springs (400) are used to reduce the size of the step hinge.

The washer (500) is coupled to the rotating shaft (210) of the rotating member (200) extended outward from the housing (100). A fixing ring (600) is mounted to an end of the rotating shaft (210) to prevent the rotating shaft (210) from separating from the housing (100).

Hereinafter, an operation of a step hinge in accordance with the present invention will be described.

Figure 9:
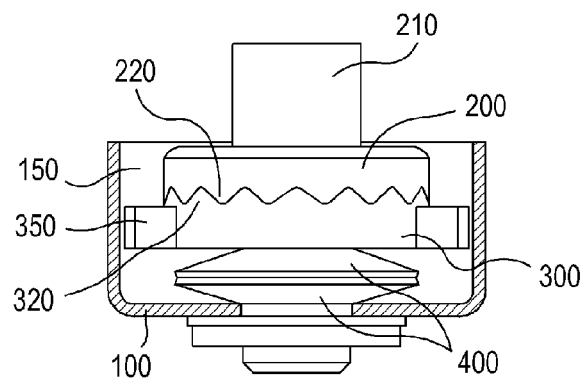
FIGS. 9 and 10 are cross-sectional views showing an operation of the rotating member and the friction member shown in FIGS. 7 and 8.
Figure 10:
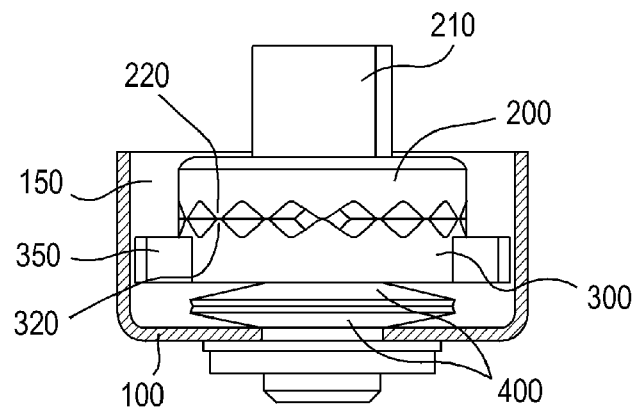
Figure 11:
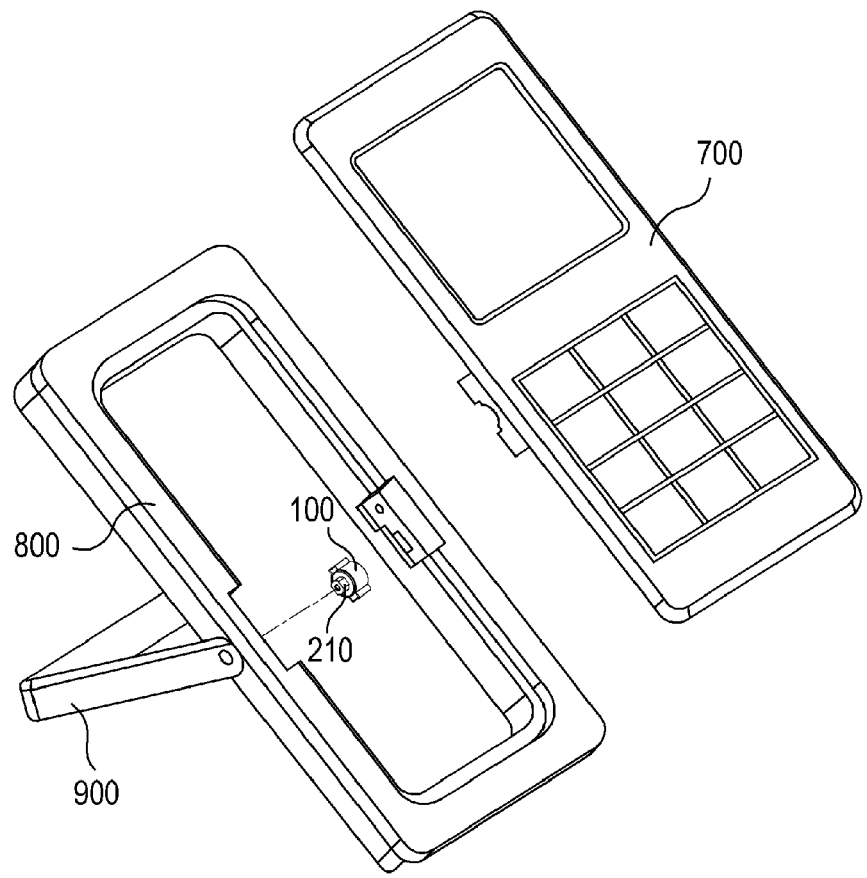
FIG. 11 is an exploded view showing a mounting condition of the step hinge shown in FIG. 4 to a portable communication terminal.

FIGS. 9 and 10 are cross-sectional views showing an operation of the rotating member and the friction member shown in FIGS. 7 and 8. FIG. 11 is an exploded view showing a mounting condition of the step hinge shown in FIG. 4 to a portable communication terminal.

As shown in FIG. 11, the step hinge in accordance with the present invention is mounted between a cover (700) and a main body (800) of a portable communication terminal. The rotating member (200) of the step hinge is coupled to a support (900).

Initially, the first cam protrusion (220) of the rotating member (200) and the second cam protrusion (320) of the friction member (300) are engaged to each other, as shown in FIG. 9. When a user rotates the support (900), the rotating member (200) is rotated simultaneously. At this time, the first cam protrusion (220) presses the second cam protrusion (320). Thus, the belleville springs are pressed and deformed so as to be flattened. Then, the gap between the first cam protrusion (220) and the second cam protrusion (320) becomes widened, as shown in FIG. 10. When the rotating member is further rotated, the resistance against the pressure of belleville springs (400) becomes greater. Then, the belleville springs are restored to their former state of pressing the second cam protrusion (320) oppositely. Thus, the first cam protrusion (220) and the second cam protrusion (320) become engaged to each other as the initial condition. During the operation, the guides (350) at both sides of the friction member (300) are restricted in the groove (150) of the housing (150). Thus, the friction member (300) cannot rotate with the rotating member (200) at the moment that it presses the belleville springs (400) or it is pressed by elastic reaction of the belleville springs (400). However, the friction member (300) slides back and forth in the direction of the rotating axis of rotating member (200) in the housing (100).

A rotation range of the rotating member (200) is restricted by the first stopper (230) and the second stopper (330). Thus, a rotation range of the support (900), which is coupled to the rotating shaft (210) of the rotating member (200), is restricted by the stoppers.

While the present invention has been described and illustrated with respect to a preferred embodiment of the invention, it will be apparent to those skilled in the art that variations and modifications are possible without deviating from the broad principles and teachings of the present invention, which should be limited solely by the scope of the claims appended hereto.

The invention claimed is:

1. A step hinge suitable for supporting a portable communication terminal on a support surface at a plurality of inclination angles, the step hinge comprising:
 a housing having an opening and at least one guide receiving portion;
 a rotating member in the housing, the rotating member including a plurality of first cam protrusions and a rotating shaft;
 a friction member in the housing, the friction member including an opening, a plurality of second cam protrusions in contact with the first cam protrusions, and at least one guide extending outwardly from the friction member, the at least one guide slidably received in the at least one guide receiving portion of the housing such that rotation of the friction member relative to the housing is prevented;
 a pair of belleville springs in the housing and configured to press the friction member and the rotating member for a tight contact therebetween, each belleville spring including an opening and a portion in contact with a corresponding portion of the other belleville spring;
 the rotating shaft passes through the opening in each of the housing, the two belleville springs, and the friction member,
 wherein:
 rotation of the rotating member relative to the friction member generates vibrations from the first cam protrusions passing over the second cam protrusions;
 the rotating member includes a first stopper;
 the friction member includes a second stopper configured for contacting the first stopper to restrict the rotation range of the rotating member;
 the at least one guide includes a pair of guides extending outwardly from the friction member; and
 the at least one guide receiving portion includes a pair of guide receiving portions configured to slidably receive the corresponding guide therein, to prevent rotation of the friction member relative to the housing while allowing the guides of the friction member to slide back and forth in the guide receiving portions of the housing in the direction of the rotating axis of rotating member.

2. A portable communication terminal comprising:
 a support; and
 a step hinge including:
  a housing having an opening and at least one guide receiving portion;
  a rotating member in the housing, the rotating member including a plurality of first cam protrusions and a rotating shaft;
  a friction member in the housing, the friction member including an opening, a plurality of second cam protrusions in contact with the first cam protrusions, and at least one guide extending outwardly from the friction member, the at least one guide slidably received in the at least one guide receiving portion of the housing such that rotation of the friction member relative to the housing is prevented;
  a pair of belleville springs in the housing and configured to press the friction member and the rotating member for a tight contact therebetween, each belleville spring including an opening and a portion in contact with a corresponding portion of the other belleville spring; and
  the rotating shaft passes through the opening in each of the housing, the two belleville springs, and the friction member;
 wherein the support is coupled to the rotating member of the step hinge such that the rotating member is rotated together with the support, and
 wherein the support and the step hinge are operable for supporting the portable communication terminal on a support surface at a plurality of inclination angles.

3. A step hinge suitable for supporting a portable communication terminal on a support surface at a plurality of inclination angles, the step hinge comprising:
 a housing having an opening and a pair of guide receiving portions;
 a rotating member in the housing, the rotating member including a first stopper, a plurality of first cam protrusions, and a rotating shaft;
 a friction member in the housing, the friction member including an opening, a second stopper configured for contacting the first stopper to restrict the rotation range of the rotating member, a plurality of second cam protrusions in contact with the first cam protrusions, and a pair of guides extending outwardly from the friction member and slidably received in the at least one guide receiving portion of the housing such that rotation of the friction member relative to the housing is prevented;
 a pair of belleville springs in the housing and configured to press the friction member and the rotating member for a tight contact therebetween, each belleville spring including an opening and a portion in contact with a corresponding portion of the other belleville spring; and
 the rotating shaft passes through the opening in each of the housing, the two belleville springs, and the friction member.

4. The step hinge of claim 3, wherein:
 the first stopper is facing the friction member,
 the second stopper is facing the rotating member, and
 whereby contact between the first and second stoppers restricts the rotation range of the rotating member.

5. The step hinge of claim 3, wherein:
the first cam protrusions are protruded toward the friction member,
the second cam protrusions are protruded toward the rotating member, and
the friction member by the rotation of the rotating member is caused to slide back and forth in the housing.

6. The step hinge of claim 3, wherein the two belleville springs have their larger diameter portions in contact with each other.

7. The step hinge of claim 3, further comprising:
a washer coupled to the rotating shaft of the rotating member that extends outward of the housing; and
a fixing ring mounted to an end of the rotating shaft to prevent the rotating shaft from separating from the housing.

8. The step hinge of claim 3, wherein:
the plurality of first cam protrusions radially protrude toward the friction member; and
the plurality of second cam protrusions radially protrude toward the rotating member.

9. The step hinge of claim 8, wherein the first cam protrusions are in contact with the second cam protrusions such that rotation of the rotating member relative to the friction member generates vibrations from the first cam protrusions passing over the second cam protrusions.

10. The step hinge of claim 9, wherein the first and second cam protrusions are configured such that the vibrations generated from the first cam protrusions passing over the second cam protrusions are detectable by a user to determine how much the rotating member has been rotated.

11. The step hinge of claim 8, wherein the first and second cam protrusions are generally triangular.

12. The step hinge of claim 3, wherein:
the first stopper has a generally arcuate wall portion protruding towards the friction member,
the second stopper has a generally arcuate wall portion protruding towards the rotating member and configured for contacting the first stopper to restrict the rotation range of the rotating member.

13. The step hinge of claim 3, wherein:
the pair of guides extend outwardly from generally opposite sides of the friction member; and
the pair of guide receiving portions are configured to slidably receive the corresponding guide therein, to prevent rotation of the friction member relative to the housing while allowing the guides of the friction member to slide back and forth in the guide receiving portions of the housing in the direction of the rotating axis of the rotating member.

14. A portable communication terminal including a support coupled to the rotating member of the step hinge of claim 3 such that the rotating member is rotated together with the support.

15. The portable communication terminal of claim 14, wherein the support and the step hinge are operable for supporting the portable communication terminal on a support surface at a plurality of inclination angles.

16. A portable communication terminal including a support coupled to the rotating member of the step hinge of claim 3 such that the rotating member is rotated together with the support, wherein the support and the step hinge are operable for supporting the portable communication terminal on a support surface at a plurality of inclination angles, whereby the step hinge is configured such that:
rotation of the rotating member relative to the friction member generates vibrations from the first cam protrusions passing over the second cam protrusions;
rotation of the support and rotating member rotates the first cam protrusions out of engagement with the second cam protrusions such that the first cam protrusions press the second cam protrusions causing deformation and flattening of the belleville springs; and
continued rotation of the rotating member increases the resistance against the pressure of belleville springs urging the first and second cam protrusions towards each other until the belleville springs are restored to their initial un-deformed state upon the re-engagement of first cam protrusions with the second cam protrusions.

* * * * *